US 7,700,221 B2

(12) United States Patent
Yeo (10) Patent No.: US 7,700,221 B2
(45) Date of Patent: Apr. 20, 2010

(54) ELECTRODE ASSEMBLY AND LITHIUM ION SECONDARY BATTERY USING THE SAME

(75) Inventor: Kwang Soo Yeo, Gyeonggi-do (KR)

(73) Assignee: Samsung SDI Co., Ltd., Suwon-si (KR)

( * ) Notice: Subject to any disclaimer, the term of this patent is extended or adjusted under 35 U.S.C. 154(b) by 938 days.

(21) Appl. No.: 11/157,475

(22) Filed: Jun. 20, 2005

(65) Prior Publication Data

US 2006/0003221 A1    Jan. 5, 2006

(30) Foreign Application Priority Data

Jun. 22, 2004    (KR) ................. 10-2004-0046669

(51) Int. Cl.
*H01M 4/02*    (2006.01)
*H01M 4/64*    (2006.01)
*H01M 10/00*   (2006.01)

(52) U.S. Cl. ................. 429/94; 429/161; 429/209; 429/211; 429/233

(58) Field of Classification Search .................. None
See application file for complete search history.

(56) References Cited

U.S. PATENT DOCUMENTS 6,203,938 B1 *   3/2001   Yoshida et al. ............. 429/94
2003/0180605 A1 *  9/2003  Mizutani ................. 429/94
2005/0130035 A1 *  6/2005  Inada et al. ............. 429/161

FOREIGN PATENT DOCUMENTS

| JP | 2001-35484 | | 2/2001 |
| JP | 2001-155779 | | 6/2001 |
| KR | 1996-0015982 | | 5/1996 |
| WO | WO2004012284 | * | 2/2004 |

OTHER PUBLICATIONS

Patent Abstracts of Japan for Publication No.: 2001-035484; Date of publication of application Feb. 9, 2001, in the name of Chika Kanbe et al.
Patent Abstracts of Japan, Publication No. 2001-155779; Publication Date: Jun. 8, 2001; in the name of Taizo Sunano, et al.

* cited by examiner

*Primary Examiner*—Dah-Wei D Yuan
*Assistant Examiner*—Katherine Turner
(74) *Attorney, Agent, or Firm*—Christie, Parker & Hale, LLP (57) ABSTRACT

An electrode assembly and a lithium ion secondary battery using the electrode assembly having reduced winding thickness. Active materials are coated on a first region of a negative electrode collector to which a negative electrode conductive tab is welded, and on an adjacent region overlapping the first region. Active materials are also coated on a first region of a positive electrode collector, to which a positive electrode conductive tab is welded, and an adjacent region overlapping the first region. Parts of the electrode assembly corresponding to the conductive tabs do not protrude from the electrode assembly, allowing for easy insertion of the electrode assembly into a can or pouch.

17 Claims, 6 Drawing Sheets

ELECTRODE ASSEMBLY AND LITHIUM ION SECONDARY BATTERY USING THE SAME

CROSS-REFERENCE TO RELATED APPLICATIONS

This application claims priority to and the benefit of Korean Patent Application No. 2004-0046669 filed on Jun. 22, 2004 in the Korean Intellectual Property Office, the entire content of which is incorporated herein by reference.

BACKGROUND OF THE INVENTION

1. Field of the Invention

The present invention relates to a lithium ion secondary battery, and more particularly to an electrode assembly therefore.

2. Description of the Related Art

As is generally known in the art, a lithium ion secondary battery includes an electrode assembly which has positive and negative electrode collectors coated with active materials of a predetermined thickness and a separator interposed between the collectors and which is wound a number of times into a jelly roll configuration. After being wound a number of times into a jelly roll configuration, the electrode assembly is contained in a cylindrical or square-type can or a pouch and is sealed.

The collectors have conductive tabs welded thereto which extend a predetermined distance to the exterior so that charging electrical power can be applied from the exterior of the battery or discharging electrical power can be applied to the exterior of the battery. Particularly, positive and negative electrode conductive tabs are welded to the positive and negative electrode collectors, respectively. The positive and negative electrode conductive tabs have insulation tape attached to the surface thereof with a predetermined thickness to prevent the separator from being damaged and to avoid a direct short circuit.

The thickness of the collectors is about 10 µm, of the active materials, about 120 µm, of the conductive tabs, about 100 µm, and of the insulation tape, about 40 µm. The total thickness of the conductive taps and the insulation tape is substantially larger than that of the active materials.

When the electrode assembly configured as above is wound into a jelly roll configuration, the wound regions corresponding to the conductive tabs and the insulation tape are substantially thicker than the remaining wound regions. Particularly, the wound regions corresponding to the conductive tabs and the insulation tape protrude further to the exterior than the remaining regions. When the electrode assembly is inserted into a can or pouch, therefore, such irregular thickness makes the insertion of the electrode assembly difficult, sometimes causing the protruding portions to deform. Such deformation may decrease the battery capacity.

Since the electrode assembly is not easily insertable into a can, it may be pressed or squeezed to achieve the desired result. As a result, the active materials corresponding to the lower conductive tap and the insulation tape are then compressed by a strong force and may have degraded usefulness in those parts. In other words, the active materials may have little use but still increase the thickness of the electrode assembly.

Accordingly, there is a need for an electrode assembly having a reduced overall winding thickness and a lithium ion secondary battery using the same.

SUMMARY OF THE INVENTION

In accordance with the present invention, an electrode assembly is provided having active materials formed on an outer surface of a region to which a conductive tab is welded, as well as the active materials being coated on an adjacent region overlapping the conductive tab, for reduced overall winding thickness.

An electrode assembly is provided including a negative electrode collector having a negative electrode conductive tab welded near an end thereof and negative electrode active materials coated on the outer peripheral edge thereof with a predetermined spacing from the negative electrode conductive tab. Additionally, the electrode assembly includes a positive electrode collector having a positive electrode conductive tab welded near an end thereof and positive electrode active materials coated on the outer peripheral edge thereof with a predetermined spacing from the positive electrode conducive tab, the positive electrode collector being wound a number of times together with the negative electrode collector.

In accordance with another embodiment of the present invention, a lithium ion secondary battery is provided including an electrode assembly including a negative electrode collector having a negative electrode conductive tab welded to a surface thereof while extending to the exterior and negative electrode active materials coated on both surfaces thereof. The electrode assembly may also include a positive electrode collector having a positive electrode conductive tab welded to a surface thereof while protruding to the exterior and positive electrode active materials coated on the outer peripheral edge of both surfaces thereof, except for a region corresponding to the positive electrode conducive tab during winding. The electrode assembly may be wound with a separator being interposed between both surfaces of the negative electrode collector. The battery may also include a can having first surface, a second surface connected to the first surface, a third surface connected to both the first and second surfaces, and an opening formed on the top thereof facing the third surface so that the electrode assembly may be coupled thereto; a cap assembly welded to the top of the can to prevent the electrode assembly from escaping to the exterior; and an electrolyte injectable into the can.

The electrode assembly and the lithium ion secondary battery using the same do not have active materials formed in the regions of the negative and positive electrode collectors constituting the electrode assembly, which overlap the conductive tabs. This minimizes the winding thickness of the electrode assembly. Particularly, the winding regions corresponding to the conductive tabs and the insulation tape do not protrude further to the exterior than the remaining regions. Such an electrode assembly is easily insertable into a can or pouch. This improves workability, suppresses deformation, and avoids degradation of battery capacity.

BRIEF DESCRIPTION OF THE DRAWINGS

FIG. 1A.1 is a top view showing an unfolded negative electrode collector of an electrode assembly according to an embodiment of the present invention.

FIG. 1A.2 is a top view showing an unfolded positive electrode collector of an electrode assembly according to an embodiment of the present invention.

FIG. 1B.1 is a bottom view of the electrode assembly shown in FIG. 1A.1.

FIG. 1B.2 is a bottom view of the electrode assembly shown in FIG. 1A.2.

FIG. 1C.1 is a sectional view taken along line 1-1 of FIG. 1A.1.

FIG. 1C.2 is a sectional view taken along line 1-1 of FIG. 1A.2.

DETAILED DESCRIPTION OF THE PREFERRED EMBODIMENTS

Figure 1A:
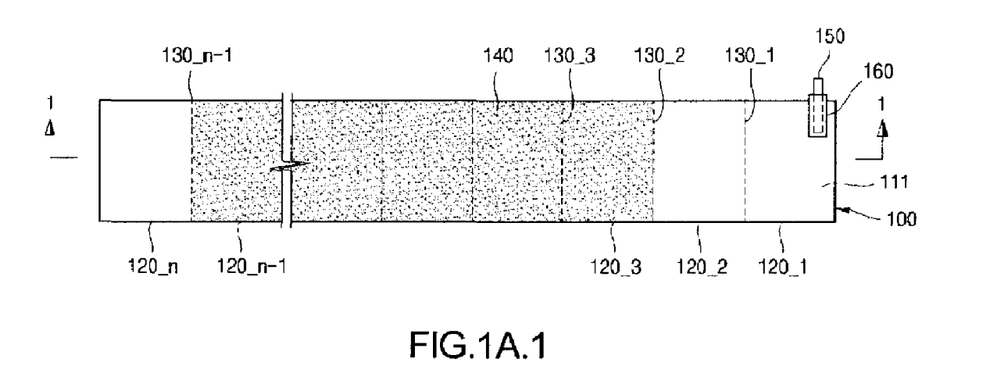

Referring to FIGS. 1A.1, 1B.1 and 1C.1, the electrode assembly according to an embodiment of the present invention includes an approximately plate-shaped negative electrode collector 100, negative electrode active materials 140 coated on predetermined regions of both surfaces of the negative electrode collector 100 and a negative electrode conductive tab 150 welded to a predetermined region of the negative electrode collector 100. Referring to FIGS. 1A.2, 1B.2 and 1C.2, the electrode assembly may also include a positive electrode collector 200, positive electrode active materials 240 formed by coating in predetermined regions of both surfaces of the positive electrode collector 200, and a positive electrode conductive tab 250 welded to a predetermined region of the positive electrode collector 200.

Figure 1A:
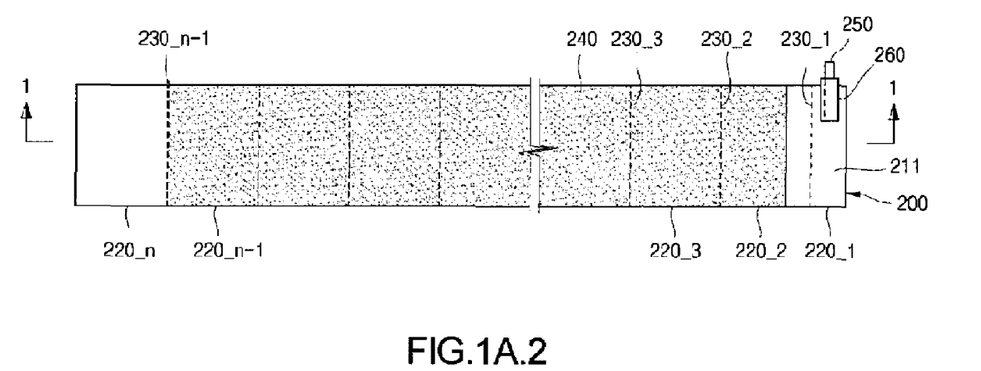
Figure 1B:
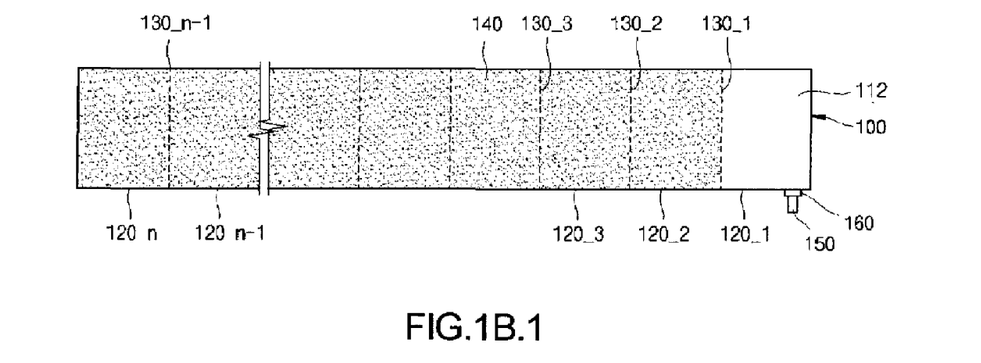
Figure 1B:
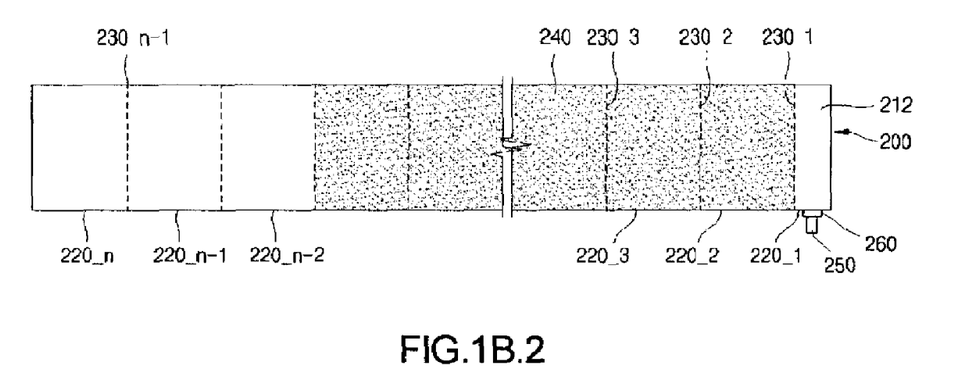
Figure 1C:
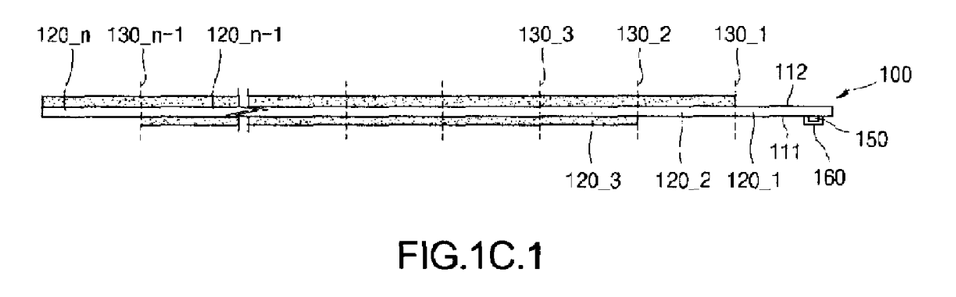

The negative electrode collector 100 has a substantially planar first surface 111 and substantially second surface 112 opposing the first surface 111. The negative electrode collector 100 has substantially square or rectangular $1^{st}$, $2^{nd}$ ... $(n-1)^{th}$, and $n^{th}$ regions 120_1, 120_2 ... 120_n-1, and 120_n formed on the first and second surfaces 111, 112 and $1^{st}$, $2^{nd}$ ... $(n-2)^{th}$, and $(n-1)^{th}$ folding lines 130_1, 130_2 ... 130_n-2, and 130_n-1 formed between the respective regions. The negative electrode collector 100 is wound a number of times by folding it about the respective folding lines 130_1, 130_2 ... 130_n-2, and 130_n-1. The negative electrode collector 100 may be made up of, for example, copper foil or an equivalent thereof, but is not limited to that material.

The negative electrode active materials 140 are formed by coating the $3^{rd}$, $4^{th}$ ... $(n-2)^{th}$, and $(n-1)^{th}$ regions 120_3, 120_4 ... 120_n-2, and 120_n-1 of the first surface 111 of the negative electrode collector 100. The negative electrode active materials are also coated on the $2^{nd}$, $3^{rd}$ ... $(n-1)$, and $n^{th}$ regions 120_2, 120_3 ... 120_n-1, and 120_n of the second surface 112 of the negative electrode collector 100 to a predetermined thickness. The negative electrode active materials 140 may be made up of, for example, graphite or an equivalent thereof, but are not limited to that material.

The negative electrode conductive tab 150 is welded to the first region 120_1 of the first surface 111 of the negative electrode collector 100 and protrudes a predetermined distance to the exterior. The surface of the negative electrode conductive tab 150 is enclosed by insulation tape 160 to prevent the separator (described in more detail below) from being damaged and avoid a direct short circuit to the positive electrode collector 200. The negative electrode collector 150 may be made from, for example, nickel or an equivalent thereof, but is not limited to that material.

Figure 1C:
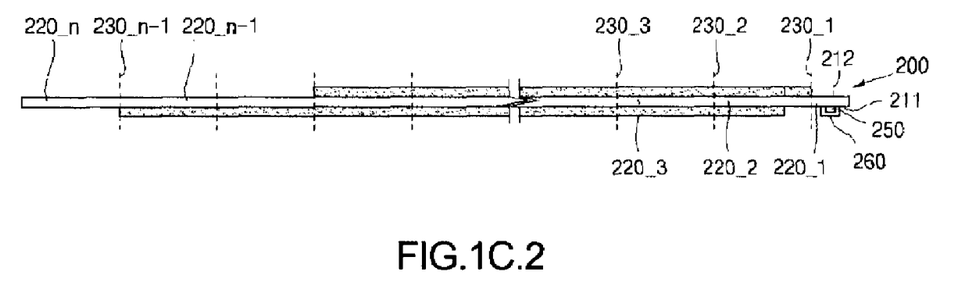

The positive electrode collector 200 has a substantially planar first surface 211 and a substantially planar second surface 212 opposing the first surface 211. The positive electrode collector 200 has substantially square or rectangular $1^{st}$, $2^{nd}$ ... $(n-1)^{th}$, and $n^{th}$ regions 220_1, 220_2 ... 220_n-1, and 220_n formed on the first and second surfaces 211 and 212 and $1^{st}$, $2^{nd}$ ... $(n-2)^{th}$, and $(n-1)^{th}$ folding lines 230_1, 230_2 ... 230_n-2, and 230_n-1 formed between the respective regions.

The first region 220_1 of the positive electrode collector 200 may have a width smaller than that of the remaining $2^{nd}$, $3^{rd}$ ... $(n-1)^{th}$, and $n^{th}$ regions 220_2, 220_3 ... 220_n-1, and 220_n. More specifically, the first region 220_1 of the positive electrode collector 200 may have a width, length, or area ratio corresponding to 20-80% of that of the remaining regions. The positive electrode collector 200 is wound a number of times by folding it about the respective folding lines 230_1, 230_2 ... 230_n-2, and 230_n-1. The positive electrode collector 200 may be made from, for example, aluminum foil, aluminum mesh, or an equivalent thereof, but is not limited to that material.

The positive electrode active materials 240 are coated on the $3^{rd}$, $4^{th}$ ... $(n-2)^{th}$, and $(n-1)^{th}$ regions 220_3, 220_4 ... 220_n-2, and 220_n-1 of the first surface 211 of the positive electrode collector 200. The positive electrode active materials 240 are also coated on the $2^{nd}$, $3^{rd}$ ... $(n-4)^{th}$, and $(n-3)^{th}$ regions 220_2, 220_3 ... 220_n-4, and 220_n-3 of the second surface 212 of the positive electrode collector 200 with a predetermined thickness. Additionally, the positive electrode active materials 240 may also be coated on a predetermined region of the second region 220_2 of the first surface 211 of the positive electrode collector 200. More specifically, the positive electrode active materials 240 may be coated on the outer peripheral edge of the second region 220_2 of the first surface 211, except for a part thereof which contacts the positive electrode conductive tab 250 (described in more detail below) as the positive electrode collector 200 is folded. This minimizes the winding thickness because the positive electrode active materials 240 are not coated on a region which directly contacts the positive electrode conductive tab 250 as the positive electrode collector 200 is wound. As a result, the total thickness does not increase from the combined thickness of the positive electrode conductive tab 250 and the insulation tape 260, since the positive electrode active materials 240 are not coated on a region contacting them. Such thickness control minimizes the amount of protrusion of the electrode assembly after it is wound. The positive electrode active materials 240 may be made up of lithium cobalt oxide or an equivalent thereof, but are not limited to that material.

The positive electrode conductive tab 250 is welded to the first region 220_1 of the first surface 211 of the positive electrode collector 200 and extends a predetermined distance to the exterior. The surface of the positive electrode conductive tab 250 is enclosed by the insulation tape 260 to prevent the separator (not shown) from being damaged by the positive electrode conductive tab 250 and to avoid a direct short circuit of the negative electrode collector 100. The positive electrode collector 250 may be made up of aluminum or an equivalent thereof, but is not limited to that material.

Figure 2A:
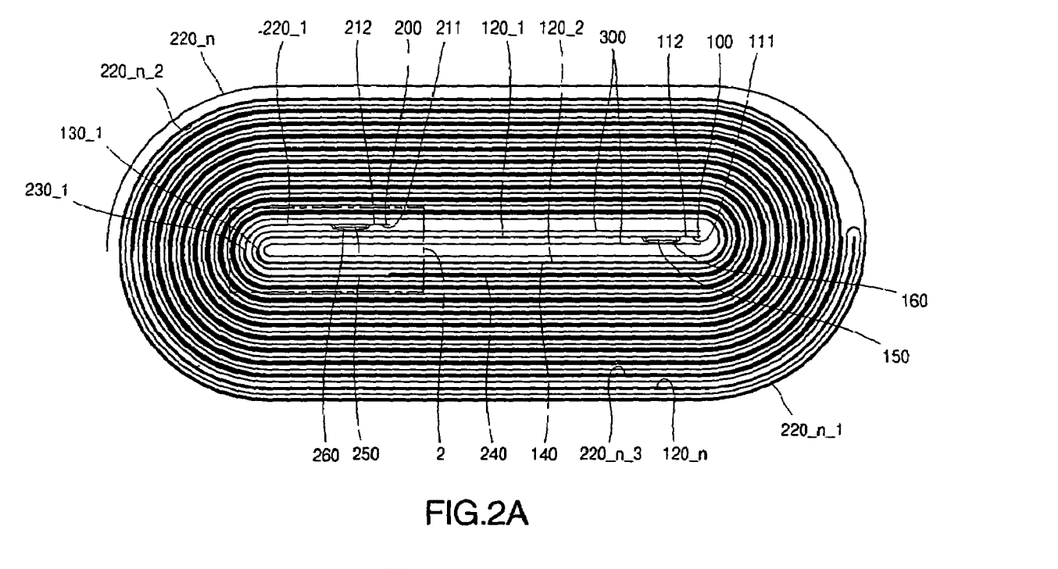
FIG. 2A is an overall sectional view showing an electrode assembly which is wound with a separator interposed.
Figure 2B:
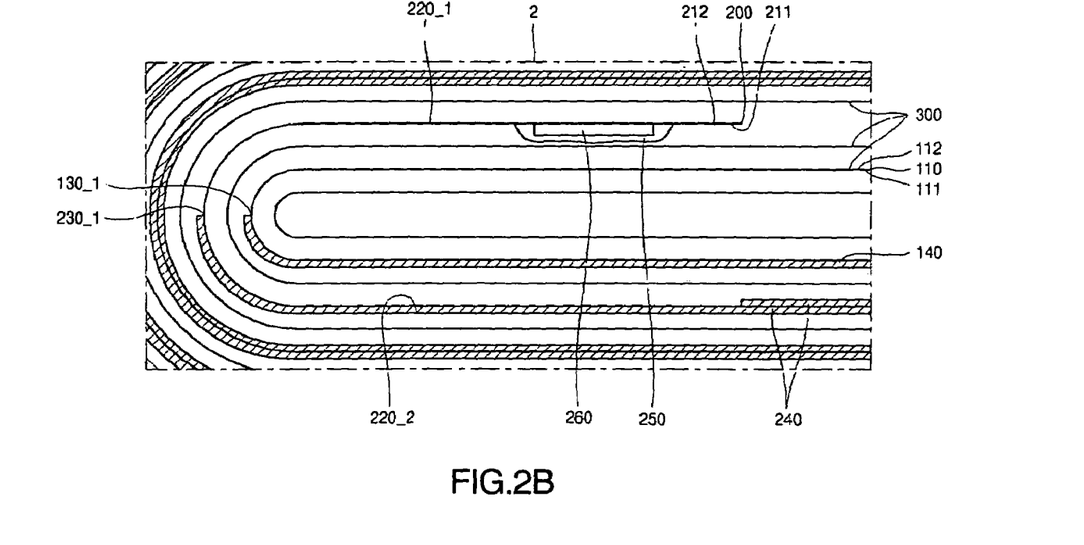
FIG. 2B is a magnified view of region 2 of FIG. 2A.

FIG. 2A shows a sectional view of an electrode assembly which is wound with a separator interposed and FIG. 2B shows a magnified view of region 2 of FIG. 2A. In the drawings, the negative electrode collector 100, the separator 300, and the positive electrode collector 200 are shown to be positioned with some spacing among them for ease of understanding. It is to be noted, however, that they are wound with respect to one another with little spacing in the actual electrode assembly.

As shown, the negative electrode collector 100 coated with the negative electrode active materials 140 is wound in the counterclockwise direction about the negative electrode conductive tab 150. Specifically, the negative electrode collector 100 is wound beginning with the first and second regions 120_1 and 120_2 of the first surface 111 facing each other. The negative electrode conducive tab 150 is welded to the first region 120_1 of the first surface 111 of the negative electrode collector 100 and is enclosed by insulation tape 160. The first and second surfaces 111 and 112 of the negative electrode collector 100 are enclosed by the separator 300 to prevent the negative electrode collector 100 from directly short-circuiting the positive electrode collector 200. The separator 300 is also interposed between the first and second regions 120_1 and 120_2 of the first surface 111 of the negative electrode collector 100 to prevent the first and second regions 120_1 and 120_2 from directly contacting each other.

The negative electrode active materials 140 coating the negative electrode collector 100 are coated starting from the third region 120_3 of the first surface 111 and from the second region 120_2 of the second surface 112. The negative electrode active materials 140 are coated up to the $(n-1)^{th}$ region 120_n-1 of the first surface 111 of the negative electrode collector 100 and up to the $n^{th}$ region 120_n of the second region 112 thereof.

The first region 220_1 of the first surface 211 of the positive electrode collector 200 is fastened to the first region 120_1 of the second surface 112 of the negative electrode collector 100 with the separator 300 interposed between them. The first region 220_1 of the positive electrode collector 200 has a width or length smaller than the remaining regions. The positive electrode conductive tab 250 is welded to the first region 220_1 of the first surface 211 and is enclosed by insulation tape 260. The positive electrode active materials 240 coating the first surface 211 of the positive electrode collector 200 are coated on a predetermined part of the second region 220_2. More specifically, the positive electrode active materials 240 are coated on the outer peripheral edge of the second region 220_2 overlapping the positive electrode conducive tab 250 and minimizing the increase in thickness due to the positive electrode conductive tab 250 and insulation tape 260. In practice, such a coating structure of the positive electrode active materials 240 results in thickness reduction of about 100 µm in the electrode assembly.

The positive electrode active materials 240 coating the second surface 212 of the positive electrode collector 200 are coated starting from the second region 220_2. The first surface 220_1 of the positive electrode collector 200 is wound together when the negative electrode collector 100 is folded for the second time and, at the end of winding, the positive electrode collector 200 encloses the negative electrode collector 100. In the case of a square-type can, the can itself acts as the positive electrode and short circuiting between the negative electrode collector 100 and the can may be effectively avoided. The positive electrode active materials 240 are coated up to the $(n-1)^{th}$ region 220_n-1 of the first surface 211 of the positive electrode collector 200 and up to the $(n-3)^{th}$ region 220_n-3 of the second region 212 thereof. Thus, the positive electrode collector 200 is directly exposed to the surface of the electrode assembly without the positive electrode active materials 240 being interposed.

Figure 3A:
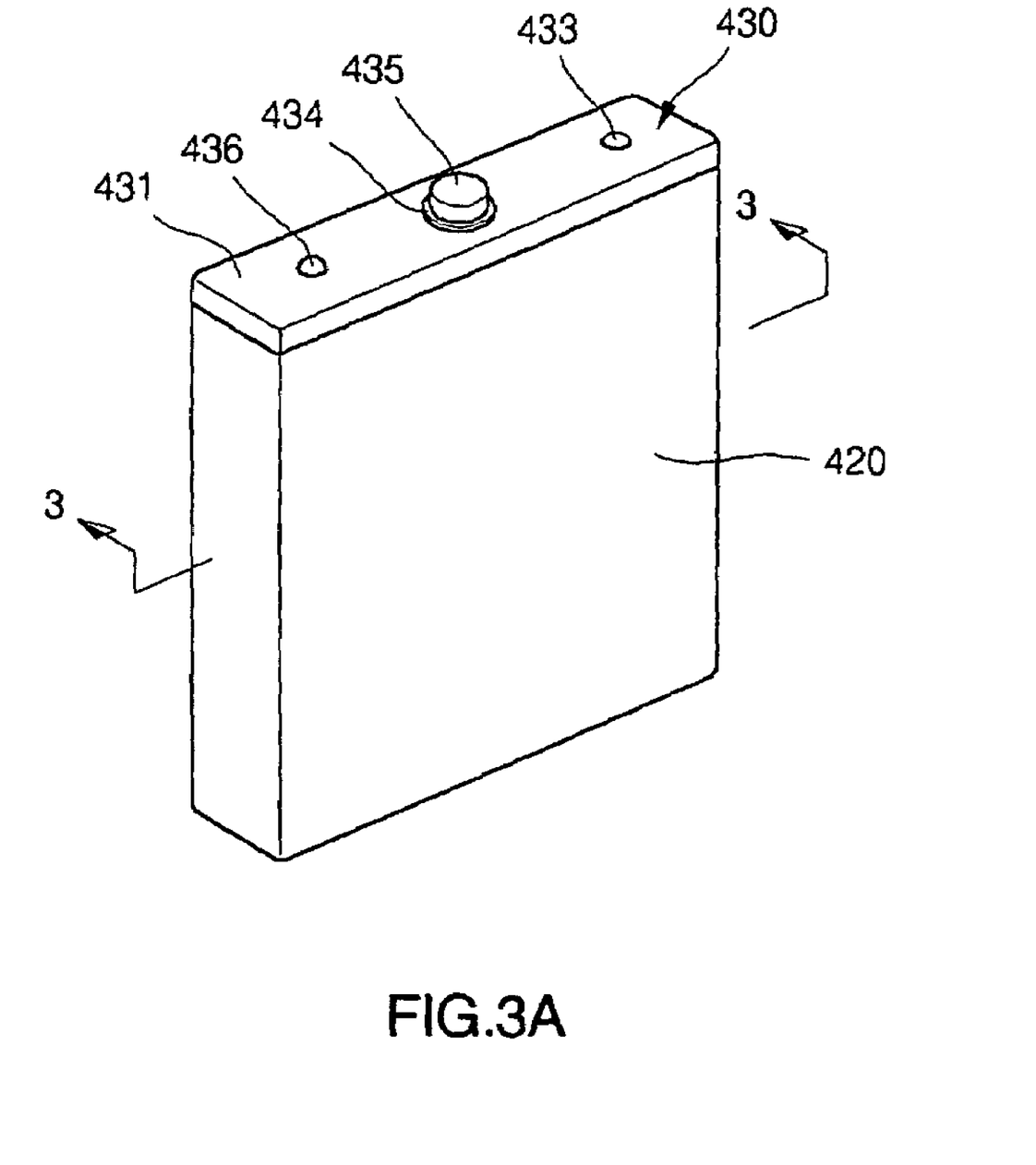
FIG. 3A is a perspective view showing a lithium ion secondary battery according to an embodiment of the present invention.
Figure 3B:
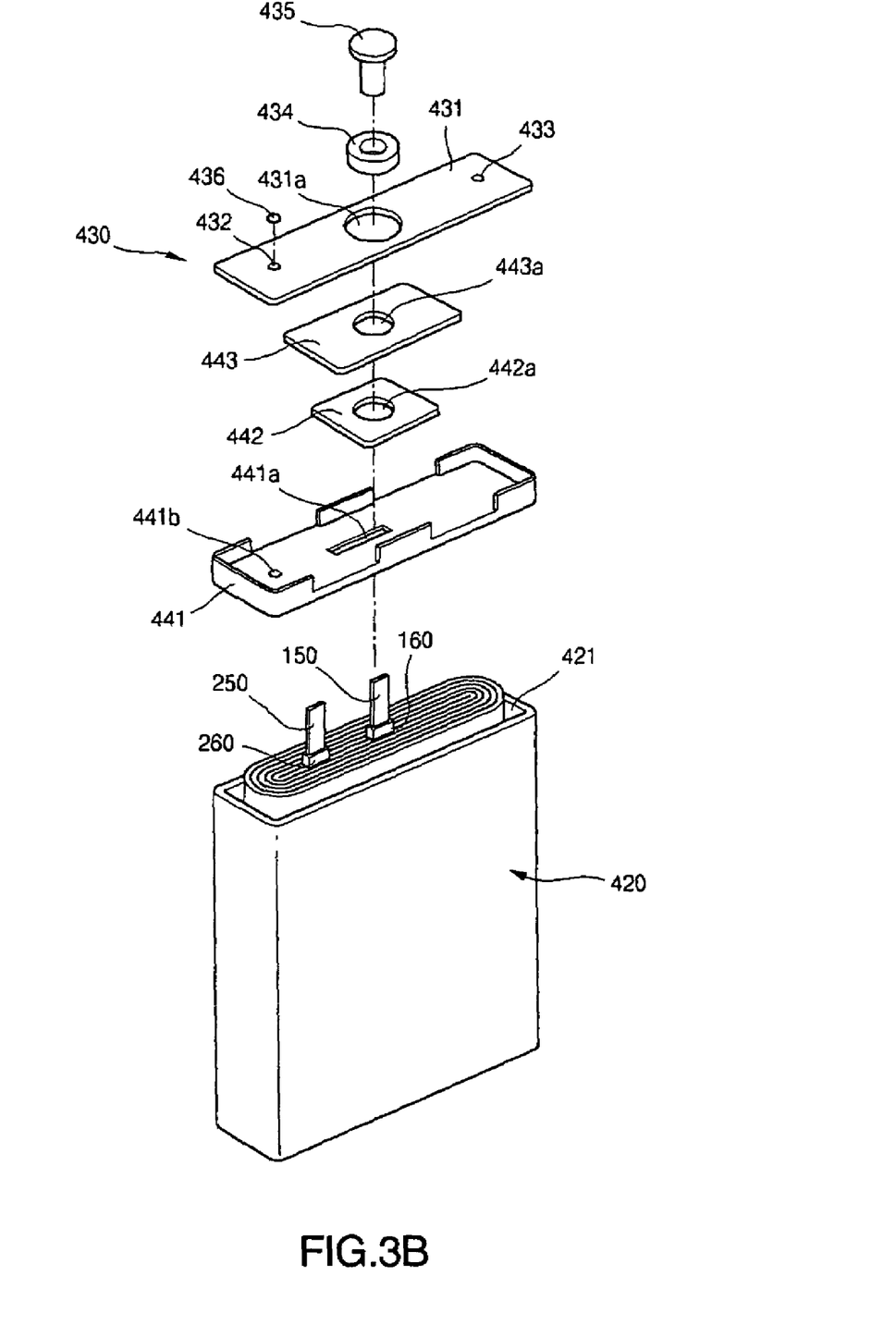
FIG. 3B is an exploded perspective view of the lithium ion secondary battery shown in FIG. 3A.
Figure 3C:
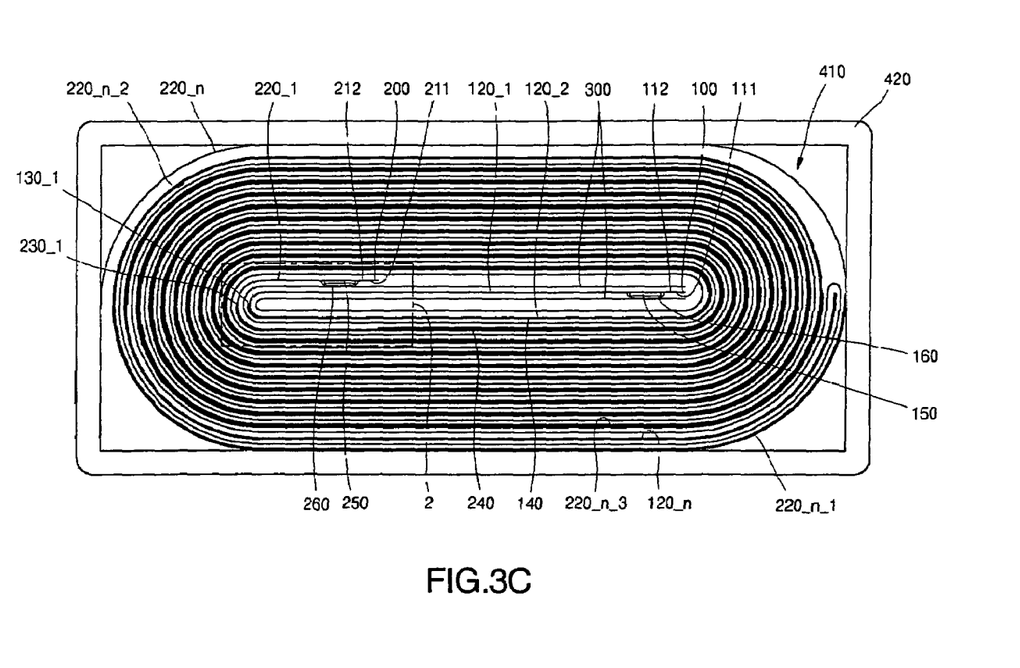
FIG. 3C is a sectional view taken along line 3-3 of FIG. 3A.

FIG. 3A shows a perspective view of a lithium ion secondary battery according to an embodiment of the present invention. Additionally, FIG. 3B shows an exploded perspective view of the lithium ion secondary battery shown in FIG. 3A and FIG. 3C shows a sectional view taken along line 3-3 of FIG. 3A.

As shown, the lithium ion secondary battery according to an embodiment of the present invention includes an electrode assembly 410 (100 and 200 are combined into 410) (FIG. 3C), a can 420 for containing the electrode assembly 410, an electrolyte (not shown) injectable into the can 420 to enable lithium ions to move, and a cap assembly 430 for covering the can 420 and preventing the electrode assembly 410 and the electrolyte from escaping to the exterior. Although a square-type battery is given as an example herein, the present invention may also be applied to other batteries, for example, cylindrical and pouch-type batteries.

The electrode assembly 410 includes a negative electrode collector 100 having negative electrode active materials 140 (for example, graphite) attached thereto, a positive electrode collector 200 having positive electrode active materials 240 (for example, lithium cobalt oxide) attached thereto, and a separator 300 enclosing the negative and positive electrode collectors 100 and 200 to avoid a short circuit and to enable only lithium ions to move. The negative and positive electrode collectors 100 and 200 and the separator 300 are wound a number of times into a jelly roll configuration and are contained in the can 420. The negative electrode collector 100 is provided with insulation tape 160 after a negative electrode conductive tab 150 is welded thereto and the positive electrode collector 200 is provided with insulation tape 260 after a positive electrode conductive tab 250 is welded thereto.

The coating configuration of the negative and positive electrode active materials 140, 240 include all features described with reference to FIGS. 1a.1, 1a.2, 1b.1, 1b.2, 1c.1, 1c.2, 2a and 2b. Specifically, the negative electrode active materials 140 are coated on the $2^{nd}$, $3^{rd}$ ... $(n-2)^{th}$, and $(n-1)^{th}$ regions 120_2, 120_3 ... 120_n-2, and 120_n-1 of the first surface 111 of the negative electrode collector 100 and on the $2^{nd}$, $3^{rd}$ ... $(n-1)^{th}$, and $n^{th}$ regions 120_2, 120_3 ... 120_n-1, and 120_n of the second surface 112 thereof. The positive electrode active materials 240 are coated from a predetermined region of the second region 220_2 of the first surface 211 of the positive electrode collector 200, which is the outer peripheral edge of a region thereof overlapping the positive electrode conductive tab 250 and the insulation tape 260, to the $(n-1)^{th}$ region. The positive electrode active materials 240 are also coated on the $2^{nd}$, $3^{rd}$ ... $(n-4)^{th}$, and $(n-3)^{th}$ regions 220_2, 220_3 ... 220_n-4, and 220_n-3 of the second surface 212.

Such a structure of the electrode assembly 410 minimizes the increase in thickness caused by the negative or positive electrode conductive tab 150, 250 and allows easy insert of the electrode assembly 410 into the can 420.

The can 420 has a substantially hexahedron shape with a top opening 421. The can 420 may be made up of aluminum (Al), iron (Fe), an alloy, or an equivalent thereof, but is not limited to those materials.

The electrolyte (not shown) is injected into the can 420 and is positioned between the negative and positive electrode collectors 100, 200 of the electrode assembly 410. The electrolyte acts as a medium for movement of lithium ions created by the electrochemical reaction between the negative and positive electrode collectors 100, 200 inside the battery during charging/discharging and may be a non-aqueous organic electrolyte, which is a mixture of lithium salt and a high-purity organic solution. The electrolyte may also be made up of a polymer using a high molecular electrolyte.

An insulation case 441, a terminal plate 442, and an insulation plate 443 may be additionally coupled to the opening 421 of the can 420 on top of the electrode assembly 410, but these components are not always necessary. The insulation case 441, the terminal plate 442, and the insulation plate 443 have through holes 441*a*, 442*a*, 443*a* formed therein, respectively, so that the negative and positive electrode conductive tabs 150 and 250 may protrude through in the upward direction. The insulation plate 442 has an electrolyte through-hole 441*b* formed therein so that, when an electrolyte is injected through the cap plate 431 (described later), it can easily flow toward the electrolyte assembly 410.

The cap assembly 430 is welded to the opening 421 of the can 420 by laser welding and includes a substantially rectangular plate-shaped cap plate 431. The cap plate 431 has a through-hole 431*a* formed at the center thereof with a predetermined size, an electrolyte injection hole 432 formed on a side thereof for electrolyte injection, and a safety vent 433 formed on the other side thereof with a comparatively small thickness. An insulation gasket 434 is coupled to the through-hole 431 a of the cap plate 431 and a negative electrode terminal 435 is coupled to the insulation gasket 434. The electrode terminal 435 is welded to the negative electrode conductive tab 150 to act as a negative electrode during charging or discharging of the battery. The positive electrode conductive tab 250 is welded between the electrode injection hole 432 of the cap plate 431 and the electrode terminal 435, so that the cap plate 431 and the can 420 as a whole act as a positive electrode. The electrolyte injection hole 432 of the cap plate 431 has a plug 436 coupled and welded thereto so that after electrolyte is injected, the electrolyte is prevented from leaking out.

As mentioned above, the electrode assembly and the lithium ion secondary battery using the electrode assembly do not have active materials formed in the regions of the negative and positive electrode collectors constituting the electrode assembly, which overlap the conductive tabs. This minimizes the winding thickness of the electrode assembly. Specifically, the winding regions corresponding to the conductive tabs and the insulation tape do not protrude further to the exterior than the remaining regions. Such an electrode assembly can be easily inserted into a can or pouch. This improves workability, suppresses deformation, and avoids degradation of battery capacity.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An electrode assembly comprising:
a negative electrode collector having a negative collector first surface and a negative collector second surface opposite the negative collector first surface and extending between a negative electrode collector first end and a negative electrode collector second end, the negative electrode collector including a negative electrode conductive tab adjacent to the negative electrode collector first end and a negative electrode active material coated on the negative collector first surface spaced from the negative electrode conductive tab, wherein the negative collector first surface and the negative collector second surface each have a plurality of regions and a plurality of folding lines, each of the plurality of folding lines between adjacent regions of the plurality of regions, wherein a number of the plurality of folding lines is one less than a number of the plurality of regions and wherein the negative electrode active materials are coated on all but a first two regions and a last region of the plurality of regions of the negative collector first surface and coated on all but a first region of the plurality of regions of the negative collector second surface; and
a positive electrode collector having a positive collector first surface and a positive collector second surface opposite the positive collector first surface and extending between a positive electrode collector first end and a positive electrode collector second end, the positive electrode collector including a positive electrode conductive tab adjacent to the positive electrode collector first end wherein the positive electrode collector sequentially includes, in a direction from the positive electrode collector first end to the positive electrode collector second end, (1) a region in which both the positive collector first surface and the positive collector second surface are uncoated, (2) a region in which only the positive collector second surface is coated by a positive electrode active material, and (3) a region in which both the positive collector first surface and the positive collector second surface are coated by the positive electrode active material,
wherein the positive electrode collector and the negative electrode collector are wound together from their respective first ends to their respective second ends.

2. The electrode assembly as claimed in claim 1, wherein the negative electrode conductive tab is welded to a first region of the plurality of regions of the negative collector first surface and wherein the negative electrode conductive tab protrudes from the electrode assembly and is partially covered by insulation tape.

3. The electrode assembly as claimed in claim 1, wherein the negative electrode collector is wound about a first folding line of the plurality of folding lines and wherein the negative collector first surface of a first region of the plurality of regions and the negative collector first surface of a second region of the plurality of regions are fastened to each other.

4. The electrode assembly as claimed in claim 1, wherein a separator is on the negative collector first surface and on the negative collector second surface.

5. The electrode assembly as claimed in claim 1, wherein the positive collector first surface and the positive collector second surface each have a plurality of regions and a plurality of folding lines, each of the plurality of folding lines-between adjacent regions of the plurality of regions, and wherein a number of the plurality of folding lines is one less than a number of the plurality of regions.

6. The electrode assembly as claimed in claim 5, wherein the positive electrode active material is coated on all but a first region and a last region of the plurality of regions of the positive collector first surface and are coated on all but a first region and a last three regions of the plurality of regions of the positive collector second surface.

7. The electrode assembly as claimed in claim 5, wherein the positive electrode conductive tab is welded to a first region of the plurality of regions of the positive collector first surface and wherein the positive electrode conductive tab protrudes from the electrode assembly and is partially enclosed by insulation tape.

8. The electrode assembly as claimed in claim 6, wherein the positive electrode active material is on a second region of the plurality of regions of the positive collector first surface.

9. The electrode assembly as claimed in claim 6, wherein the positive electrode active material is on an outer peripheral edge of a second region of the plurality of regions of the positive collector first surface that overlaps the positive electrode conductive tab wherein the positive electrode collector is wound about a first folding line of the plurality of folding lines.

10. The electrode assembly as claimed in claim 5, wherein a first region of the plurality of regions of the positive electrode collector has a length less than a length of other regions of the plurality of regions.

11. The electrode assembly as claimed in claim 1, wherein the negative collector first surface and the negative collector second surface each have a plurality of regions, and wherein the positive collector first surface and the positive collector second surface each have a plurality of regions; wherein the negative collector second surface of a first region of the plurality of regions of the negative electrode collector is fastened to and wound with the positive collector first surface of a first region of the plurality of regions of the positive electrode collector.

12. The electrode assembly as claimed in claim 1, wherein the negative electrode collector comprises copper foil.

13. The electrode assembly as claimed in claim 1, wherein the negative electrode active materials comprise graphite.

14. The electrode assembly as claimed in claim 1, wherein the negative electrode conductive tab is a nickel tab.

15. The electrode assembly as claimed in claim 1, wherein the positive electrode collector comprises aluminum foil or aluminum mesh.

16. The electrode assembly as claimed in claim 1, wherein the positive electrode active materials comprise lithium cobalt oxide.

17. The electrode assembly as claimed in claim 1, wherein the positive electrode tab is an aluminum tab.

* * * * *